United States Patent
Chen et al.

(10) Patent No.: US 8,698,781 B2
(45) Date of Patent: Apr. 15, 2014

(54) OPTICAL TOUCH DEVICE

(75) Inventors: Hui-Hsuan Chen, Hsinchu (TW);
Wu-Chieh Liu, Hsinchu (TW);
Hung-Ching Lai, Hsinchu (TW);
Chiang-Yuan Chuang, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 548 days.

(21) Appl. No.: 12/915,613

(22) Filed: Oct. 29, 2010

(65) Prior Publication Data

US 2011/0234538 A1 Sep. 29, 2011

(30) Foreign Application Priority Data

Mar. 26, 2010 (TW) .............................. 99109137 A
Jul. 14, 2010 (TW) .............................. 99123163 A

(51) Int. Cl.
*G06F 3/042* (2006.01)

(52) U.S. Cl.
USPC ......... 345/175; 345/173; 345/176; 178/18.09

(58) Field of Classification Search
USPC ............... 704/231–257; 345/175, 18.09, 173, 345/176; 178/18.09
See application file for complete search history.

(56) References Cited

U.S. PATENT DOCUMENTS

| | | | |
|---|---|---|---|
| 2003/0137494 A1* | 7/2003 | Tulbert | 345/173 |
| 2005/0128190 A1* | 6/2005 | Ryynanen | 345/173 |
| 2005/0212778 A1* | 9/2005 | Yeh | 345/175 |
| 2006/0066537 A1* | 3/2006 | Kimura et al. | 345/76 |
| 2006/0279558 A1 | 12/2006 | Van Delden et al. | |
| 2009/0267919 A1 | 10/2009 | Chao et al. | |
| 2010/0045634 A1 | 2/2010 | Su et al. | |
| 2010/0117989 A1* | 5/2010 | Chang | 345/175 |
| 2011/0001727 A1* | 1/2011 | Ko et al. | 345/175 |
| 2011/0234538 A1* | 9/2011 | Chen et al. | 345/175 |

FOREIGN PATENT DOCUMENTS

| | | |
|---|---|---|
| CN | 101424993 | 5/2009 |
| CN | 101667084 | 3/2010 |
| TW | 200945123 | 11/2009 |

* cited by examiner

*Primary Examiner* — Alexander S Beck
*Assistant Examiner* — Bogale Amen
(74) *Attorney, Agent, or Firm* — WPAT, PC; Justin King

(57) ABSTRACT

An optical touch device includes a transparent substrate and at least a light emitting and receiving unit. The transparent substrate has a touch surface, a first light incidence surface and a first light emitting surface. Each light emitting and receiving unit includes a linear light source, a light path adjusting component and a light sensing component. The linear light source is disposed beside the first light incidence surface. The light path adjusting component is disposed between the linear light source and the first light incidence surface and configured for adjusting the incidence angles of the optical signals striking at the first incidence surface so that each of the optical signals enters into the transparent substrate through the first incidence surface with a predetermined angle. The light sensing component is disposed beside the first light emitting surface. The optical touch device has a high light utility efficiency.

14 Claims, 6 Drawing Sheets

OPTICAL TOUCH DEVICE

FIELD OF THE INVENTION

The present invention relates to a touch device, and more particularly to an optical touch device.

BACKGROUND OF THE INVENTION

A touch device has an advantage of easy operation. Recently, the touch device has been widely applied to various electronic products, for example, mobile phones, personal digital assistants (PDAs), digital cameras, music players, computers, satellite navigation devices, touch screens, and so on. Generally, a familiar type of the touch device is, for example, a resistive touch device a capacitive touch device or an optical touch device. The optical touch device has a lower cost comparative to the resistive touch device or the capacitive touch device.

FIG. 1 is a schematic, cross-sectional view of a conventional optical touch device. Referring to FIG. 1, the conventional optical touch device 100 includes a transparent substrate 110, two linear light sources 120 and two light sensing components 130. Only one of the two linear light sources 120 and only one of the two light sensing components 130 are shown in FIG. 1. The transparent substrate 110 is rectangular. The two linear light sources 120 respectively correspond to the two light sensing components 130 one by one. The linear light source 120 and the corresponding light sensing component 130 are respectively disposed at two opposite sides of the transparent substrate 110. Each of the linear light sources 120 is disposed beside a light incidence surface 112 of the transparent substrate 110, and each of the light sensing components 130 is disposed beside a light emitting surface 114 of the transparent substrate 110. In addition, a lens set 140 is disposed between each of the light sensing components 130 and the corresponding light emitting surface 114.

Each of the linear light sources 120 of the conventional optical touch device 100 includes a light emitting diode 122 for providing a plurality of optical signals 123. The optical signals 123 enter into the transparent substrate 110 through the light incidence surface 112. Then, a portion of the optical signals 123 is totally reflected many times in the transparent substrate 110 to emit from the light emitting surface 114. The lens set 140 is configured for receiving the portion of the optical signals 123 and congregating the portion of the optical signals 123 to the light sensing component 130. When a touch surface 116 of the transparent substrate 110 is touched by a touch member 50 (e.g., a finger or a pen), the portion of the optical signals 123 arriving at a portion of the touch surface 116 touched by the touch member 50 can not be totally reflected and can not be sensed by the light sensing components 130. Thus, a location of the touch member 50 along an axis can be obtained according to a location of a portion of a sensing region of each of the light sensing components 130 where the optical signals 123 is not sensed. Therefore, the exact location of the touch member 50 on the touch surface 116 can be obtained according to the information sensed by the two light sensing components 130.

However, in the conventional optical touch device 100, the optical signals 123 have different incidence angles while striking at the light incidence surface 112 to enter into the transparent substrate 110 through the light incidence surface 112. Thus, a light incidence efficiency of the optical signals 123 is low. Moreover, a portion of the optical signals 123 emits out of the transparent substrate 110 from the light emitting surface 114 without total reflections in the transparent substrate 110 so that the light sensing components 130 can not sensing the optical signals 123 exactly. Additionally, the optical signals 123 emits out of the transparent substrate 110 from the light emitting surface 114 have different emitting angles. Thus, a light congregating efficiency of the lens set 140 is low, thereby affecting the sensing effect of the corresponding light sensing component 130.

SUMMARY OF THE INVENTION

The present invention provides an optical touch device to increase a light incidence efficiency of the optical signals entering into a transparent substrate, thereby increasing a light utility efficiency.

The present invention provides an optical touch device to increase a light incidence efficiency of the optical signals irradiating on a light sensing component, thereby increasing a light utility efficiency.

To achieve at least one of the above-mentioned advantages, the present invention provides an optical touch device including a transparent substrate and at least a light emitting and receiving unit. The transparent substrate has a touch surface and a plurality of side surfaces adjacent to the touch surface. At least one of the side surfaces is a first light incidence surface and at least one of the side surfaces is a first light emitting surface opposite to the first light incidence surface. Each light emitting and receiving unit includes a linear light source, a light path adjusting component and a light sensing component. The linear light source is disposed beside the first light incidence surface of the transparent substrate and is configured for providing a plurality of optical signals into the transparent substrate. The light path adjusting component is disposed between the linear light source and the first light incidence surface and configured for adjusting incidence angles of the optical signals striking at the first incidence surface so that each of the optical signals enters into the transparent substrate through the first incidence surface with a predetermined angle. The light sensing component is disposed beside the first light emitting surface. The light sensing component and the linear light source are respectively disposed at two opposite sides of the transparent substrate. The light sensing component is configured for receiving the optical signals from the linear light source.

In one embodiment provided by the present invention, the linear light source includes a light guide plate, a light emitting component and a shell. The light guide plate has a second light incidence surface and a second light emitting surface adjacent to the second light incidence surface, and the second light emitting surface faces to the light path adjusting component. The light emitting component is disposed beside the second light incidence surface. The shell is configured for receiving the light guide plate and the light emitting component.

In one embodiment provided by the present invention, the light emitting component comprises an infrared light emitting component.

In one embodiment provided by the present invention, each light emitting and receiving unit further comprises a light concentrating component disposed between the light sensing component and the first light emitting surface and configured for receiving the optical signals emitting from the first light emitting surface. A light emitting structure is disposed on a surface of the light concentrating component far away from the transparent substrate to transmit the optical signals to the light sensing component through the light emitting structure.

In one embodiment provided by the present invention, the light emitting structure comprises a grating structure or a matte surface structure.

In one embodiment provided by the present invention, each light emitting and receiving unit includes a lens set disposed between the light sensing component and the light concentrating component. The lens set is configured for concentrating the optical signals to the light sensing component.

In one embodiment provided by the present invention, each light emitting and receiving unit further includes a reflecting member. The first reflecting member is disposed between the light sensing component and the light concentrating component and is configured for reflecting the optical signals to the light sensing component.

In one embodiment provided by the present invention, the reflecting member of the light receiving and emitting unit comprises a prism, and the prism has a third light incidence surface, a reflecting surface and a third light emitting surface. The third light incidence surface faces to the light concentrating component, the third light emitting surface faces to the light sensing component, and the reflecting surface is connected between the third light incidence surface and the third light emitting surface.

In one embodiment provided by the present invention, each light emitting and receiving unit further includes a refracting member. The refracting member is disposed between the reflecting member and the light concentrating component and is configured for refracting the optical signals to the reflecting member.

In one embodiment provided by the present invention, each light path adjusting component has a fourth light incidence surface and a fourth light emitting surface opposite to the fourth light incidence surface, the fourth light incidence surface is a convex curved surface facing to the linear light source, and the fourth light emitting surface is an inclined surface.

In one embodiment provided by the present invention, the transparent substrate is a substrate of a display panel.

In one embodiment provided by the present invention, the optical touch device further includes two reflecting layers respectively formed on the touch surface and a surface opposite to the touch surface. The reflecting layers are configured for reflecting the infrared optical signals.

In one embodiment provided by the present invention, the first light incidence surface is an inclined surface.

In one embodiment provided by the present invention, the light sensing component has a sensing region. The optical signals provided by the linear light source are totally reflected in the transparent substrate. When a touch member touches the touch surface, a portion of the optical signals is not totally reflected due to the touch member so that a portion of the sensing region of the light sensing component do not sense the portion of the optical signals.

In one embodiment provided by the present invention, the optical touch device further includes a processing unit electrically connected to the light sensing component. The processing unit is configured for judging a location of the touch member according to a location of the portion of the sensing region that do not sensing the optical signals.

To achieve at least one of the above-mentioned advantages, the present invention also provides an optical touch device including a transparent substrate and at least a light emitting and receiving unit. The transparent substrate includes a touch surface and a plurality of side surfaces adjacent to the touch surface. At least one of the side surfaces is a light incidence surface and at least one of the side surfaces is a light emitting surface opposite to the light incidence surface. Each light emitting and receiving unit includes a linear light source, a light sensing component and a light concentrating component. The linear light source is disposed beside the light incidence surface of the transparent substrate and is configured for providing a plurality of optical signals into the transparent substrate. The light sensing component is disposed beside the light emitting surface. The light sensing component and the linear light source are respectively disposed at two opposite sides of the transparent substrate. The light sensing component is configured for sensing the optical signals from the linear light source. The light concentrating component is disposed between the light sensing component and the first light emitting surface and is configured for receiving the optical signals emitting from the first light emitting surface. A light emitting structure is disposed on a surface of the light concentrating component far away from the transparent substrate to transmit the optical signals to the light sensing component through the light emitting structure.

In one embodiment provided by the present invention, the linear light source includes a light guide plate, a light emitting component and a shell. The light guide plate has a second light incidence surface and a second light emitting surface adjacent to the second light incidence surface, and the second light emitting surface faces to the light path adjusting component. The light emitting component is disposed beside the second light incidence surface. The shell is configured for receiving the light guide plate and the light emitting component.

In one embodiment provided by the present invention, the light emitting component comprises an infrared light emitting component.

In one embodiment provided by the present invention, the light emitting structure comprises a grating structure or a matte surface structure.

In one embodiment provided by the present invention, each light emitting and receiving unit includes a lens set disposed between the light sensing component and the light concentrating component. The lens set is configured for concentrating the optical signals to the light sensing component.

In one embodiment provided by the present invention, each light emitting and receiving unit further includes a reflecting member. The first reflecting member is disposed between the light sensing component and the light concentrating component, and is configured for reflecting the optical signals to the light sensing component.

In one embodiment provided by the present invention, the reflecting member of the light receiving and emitting unit comprises a prism, and the prism has a third light incidence surface, a reflecting surface and a third light emitting surface. The third light incidence surface faces to the light concentrating component, the third light emitting surface faces to the light sensing component, and the reflecting surface is connected between the third light incidence surface and the third light emitting surface.

In one embodiment provided by the present invention, each light emitting and receiving unit further includes a refracting member. The refracting member is disposed between the reflecting member and the light concentrating component and is configured for refracting the optical signals to the reflecting member.

In one embodiment provided by the present invention, the In one embodiment provided by the present invention, the transparent substrate is a substrate of a display panel.

In one embodiment provided by the present invention, the optical touch device further includes two reflecting layers respectively formed on the touch surface and a surface opposite to the touch surface. The reflecting layers are configured for reflecting the infrared optical signals.

In one embodiment provided by the present invention, the first light incidence surface is an inclined surface.

In one embodiment provided by the present invention, the light sensing component has a sensing region. The optical signals provided by the linear light source are totally reflected in the transparent substrate. When a touch member touches the touch surface, a portion of the optical signals is not totally reflected due to the touch member so that a portion of the sensing region of the light sensing component do not sense the portion of the optical signals.

In one embodiment provided by the present invention, the optical touch device further includes a processing unit electrically connected to the light sensing component. The processing unit is configured for judging a location of the touch member according to a location of the portion of the sensing region that do not sensing the optical signals.

In the optical touch devices of embodiments of the present invention, the light path adjusting component is applied so that the optical signals have an identical incidence angles while striking at the first light incidence surface of the transparent substrate. Thus, the light incidence efficiency of the optical signals entering into the transparent substrate can be increased, thereby increasing a light utility efficiency. In addition, in another embodiment, the optical touch device includes a light concentrating component for concentrating the optical signals. The light emitting structure of the light concentrating component can limit the emitting angles of the optical signals emitting from the light emitting surface. Thus, the light incidence efficiency of the optical signals irradiating on the light sensing component can be increased, thereby increasing a light utility efficiency.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
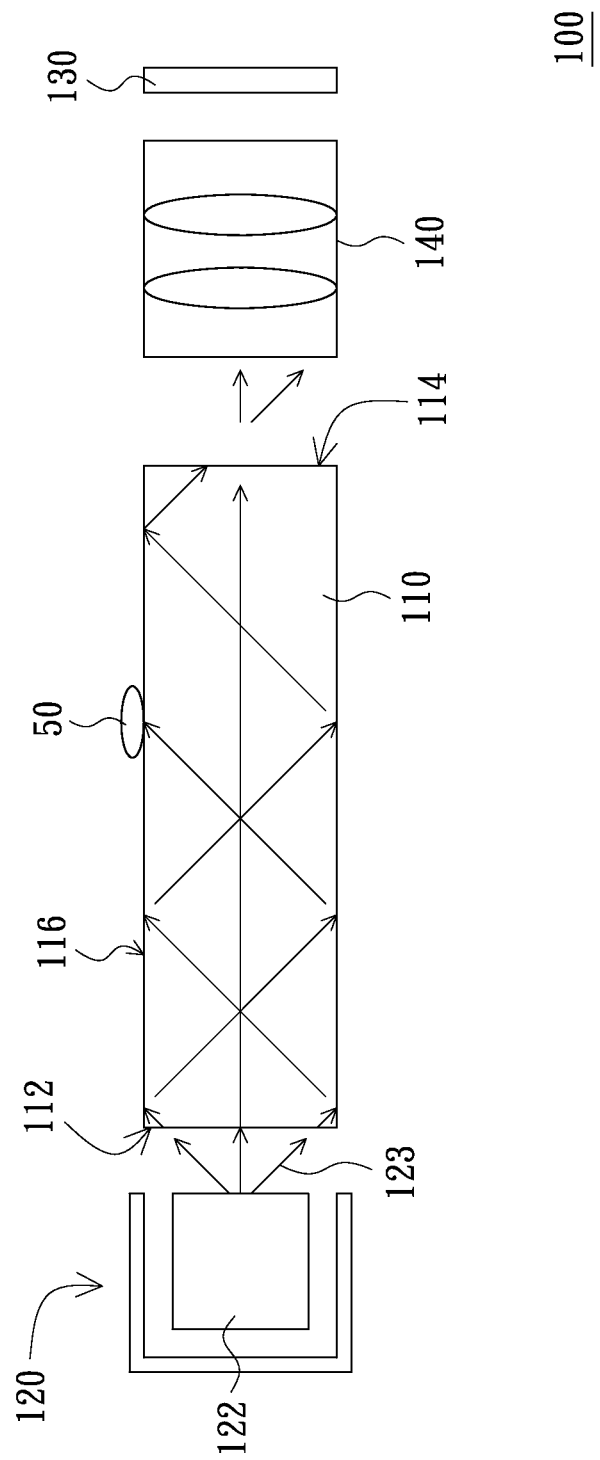
FIG. 1 is a schematic, cross-sectional view of a conventional optical touch device.
Figure 2:
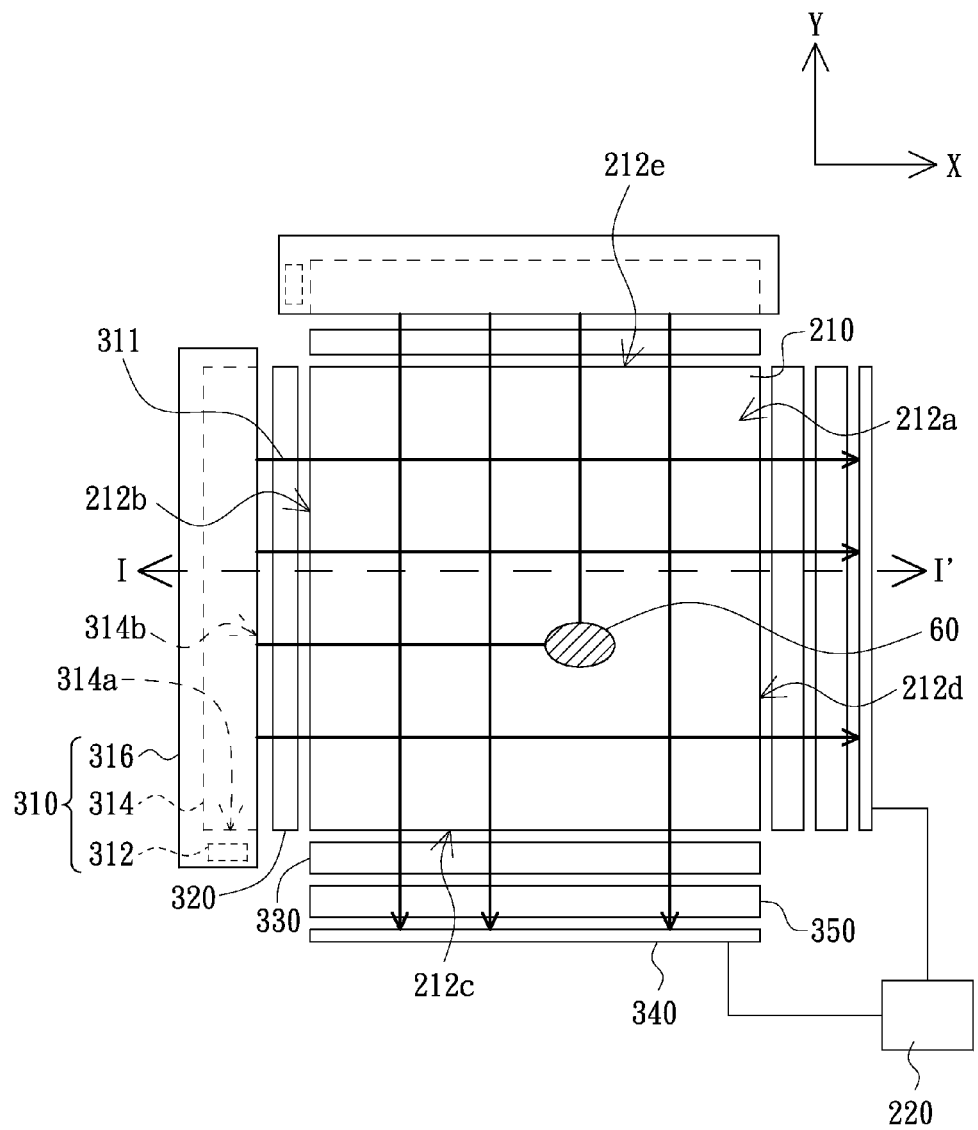
FIG. 2 is a schematic, top view of an optical touch device in accordance with an embodiment of the present invention.
Figure 3:
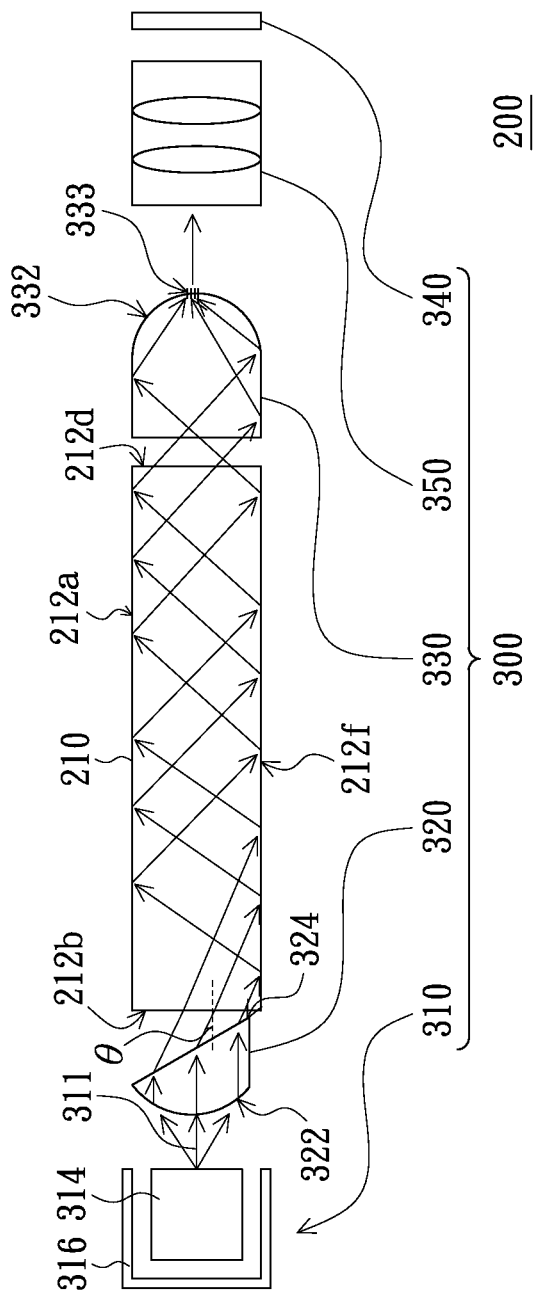
FIG. 3 is a schematic, cross-sectional view taken along a line I-I' in FIG. 2.

FIG. 2 is a schematic, top view of an optical touch device in accordance with an embodiment of the present invention. FIG. 3 is a schematic, cross-sectional view taken along a line I-I' in FIG. 2. Referring to FIG. 2 and FIG. 3, in the present embodiment, an optical touch device 200 includes a transparent substrate 210 and at least a light emitting and receiving unit 300. Two light emitting and receiving units 300 are, for example, shown in FIG. 2.

The transparent substrate 210 has a touch surface 212a and a plurality of side surfaces (e.g. the side surfaces 212b, 212c, 212d, 212e) adjacent to the touch surface 212a. At least one of the side surfaces 212b, 212c, 212d, 212e is a first light incidence surface and at least one of the side surfaces 212b, 212c, 212d, 212e is a first light emitting surface opposite to the first light incidence surface. In the embodiment, the number of the first light incidence surface and the number of the first light emitting surface respectively correspond to the number of the light emitting and receiving units 300. In the present embodiment, because the optical touch device 200 includes the two light emitting and receiving units 300, the number of the first light incidence surface and the number of the first light emitting surface are respectively two. In the present embodiment, the side surfaces 212b, 212e are the first light incidence surfaces, and the side surfaces 212c, 212d are the first light emitting surfaces. The side surfaces 212b, 212e are called the first light incidence surfaces 212b, 212e and the side surfaces 212c, 212d are called the first light emitting surfaces 212c, 212d in the following description.

Each light emitting and receiving unit 300 includes a linear light source 310, a light path adjusting component 320 and a light sensing component 340. The linear light source 310 and the light sensing component 340 of each light emitting and receiving unit 300 are disposed at two opposite sides of the transparent substrate 210. In the present embodiment, the linear light sources 310 are respectively disposed beside the first light incidence surfaces 212b, 212c of the transparent substrate 210 and are configured for providing a plurality of optical signals 311 into the transparent substrate 210 through the first light incidence surfaces 212b, 212e. The light path adjusting component 320 is disposed between the linear light source 310 and the corresponding first light incidence surface 212b/212e. The light path adjusting component 320 is configured for adjusting the incidence angles of the optical signals 311 striking at the first incidence surface 212b/212e. Thus, each of the optical signals 311 can enter into the transparent substrate 210 through the first incidence surface 212b/212e with a predetermined incidence angle θ. The light sensing components 340 are respectively disposed beside the first light emitting surfaces 212c, 212d. In each light emitting and receiving unit 300, the light sensing component 340 is configured for receiving the optical signals 311 from the corresponding linear light source 310.

Each linear light source 310 includes, for example, a light emitting component 312, a light guide plate 314 and a shell 316. Each light guide plate 312 has a second light incidence surface 314a and a second light emitting surface 314b adjacent to the second light incidence surface 314a. The second light emitting surfaces 314b of the light guide plates 314 face to the first light incidence surfaces 212b, 212e respectively. The light emitting components 312 are respectively disposed beside the second light incidence surfaces 314a. The shell 316 receives the corresponding light guide plate 314 and the corresponding light emitting component 312 therein. The light emitting components 312 are, but not limited to, infrared light emitting components, for example, light emitting diodes. Additionally, the light guide plates 314 are configured for guiding the optical signals 311 directly provided by the light emitting components 312 and the optical signals 311 reflected by the shells 316 to the first light incidence surfaces 212b, 212e.

In addition, each light path adjusting component 320 has a fourth light incidence surface 322 and a fourth light emitting surface 324 opposite to the fourth light incidence surface 322. The fourth light incidence surface 322 is a convex curved surface facing to the linear light source 310, and the fourth light emitting surface 324 is an inclined surface. The fourth light incidence surface 322 is configured for transforming the optical signals 311 passing through the fourth light incidence surface 322 into approximately parallel optical signals 311. The fourth light emitting surface 324 is configured for changing the light paths of the optical signals 311 so that each of the most optical signals 311 can enter into the transparent substrate 210 through the first incidence surface 212b/212e with the predetermined incidence angles θ. In other words, the incidence angles of the optical signals 311 striking at the first incidence surface 212b/212e can be adjusted by adjusting a slope of the fourth light emitting surface 324. In addition, it is noted that, the predetermined incidence angles θ of each of the optical signals 311 is not limited to an identical degree, but can be different. That is, the predetermined incidence angles θ of the optical signals 311 are in a range from a maximum degree and a minimum degree. A difference of the maximum degree and the minimum degree can be about a few of degrees.

In general, when the touch surface 212a of the transparent substrate 210 is not touched by a touch member (e.g., a finger), the touch surface 212a is contacted with air. After the optical signals 311 from the linear light source 310 enter into the transparent substrate 210 through the first light incidence surfaces 212b, 212e, the total reflections of the optical signals 311 are occurred in the transparent substrate 210. Then, the optical signals 223 emit from the first light emitting surfaces 212c, 212d to be sensed by the corresponding light sensing component 340. A forward direction of the optical signals 311 from one of the two linear light sources 310 is, for example, parallel to an X axis, and a forward direction of the optical signals 311 from the other of the two linear light sources 310 is, for example, parallel to a Y axis. Additionally, when a touch member 60 (e.g., a finger, a pen or other objects) touches the touch surface 212a, a portion of the optical signals 311 arriving at the portion of the touch surface 212a touched by the touch member 60 can not be sensed by the light sensing components 340. More specifically, because the refraction index of the touch member 60 is greater than the refraction index of the air, the portion of the optical signals 311 can not be totally reflected. In other words, when the touch member 60 touches the touch surface 212a, the total reflections of the portion of the optical signals 311 do not occurred. Thus, a portion of the sensing region of each light sensing component 340 can not sense the optical signals 311 and a location of the touch member 60 can be obtained according to the sensing region of each light sensing component 340 that do not sense the optical signals 311. Further, the optical touch device 200 includes a processing unit 220. The processing unit 220 is electrically connected to the light sensing components 340. The processing unit 220 is configured for judging the location of the touch member 60 according to the location of the portion of the sensing region that do not sensing the optical signals 340.

In the present embodiment, each light sensing component 340 can be a complementary metal oxide semiconductor (CMOS) image sensor, a charge coupled device (CCD), or other suitable light sensing component. In addition, the light sensing component 340 beside the first light emitting surface 212c can sense the location of the touch member 60 along the X axis, and the light sensing component 340 beside the first light emitting surface 212d can sense the location of the touch member 60 along the Y axis. Therefore, the two light sensing components 340 can sense the exact location of the touch member 60 located on the touch surface 212a.

In the present embodiment, the light path adjusting component 320 is applied to the optical touch device 200 so that each of the optical signals 311 strikes at the first incidence surface 212b/212e of the transparent substrate 210 with the predetermined incidence angle θ. Thus, the light incidence efficiency of the optical signals 311 entering into the transparent substrate 210 can be increased, thereby increasing a light utility efficiency of the optical touch device 200.

It is noted that, the optical touch device 200 includes, but not limited to, the two light emitting and receiving units 300. In another embodiment, the optical touch device can includes one light emitting and receiving unit 300 or more than two the light emitting and receiving units 300 according to the demand. In addition, in order to increase the reflectivity of the optical signals 311, two reflecting layers (not shown) can be respectively formed on the touch surface 212a and a surface 212f opposite to the touch surface 212a. For example, in one embodiment, when the light emitting components 312 are the infrared light emitting components, the reflecting layers are, for example, configured for reflecting the infrared optical signals.

In order to further increase the light utility efficiency of the optical touch device 200, each light emitting and receiving unit 300 can further include a light concentrating component 330. The light concentrating component 330 is disposed between the light sensing component 340 and the corresponding first light emitting surface 212c/212d. The light concentrating component 330 is configured for receiving the optical signals 311 emitting from the first light emitting surface 212c/212d. A light emitting structure 333 is disposed on a surface 332 of the light concentrating component 330 far away from the transparent substrate 210 to transmit the optical signals 311 to the corresponding light sensing component 340 through the light emitting structure 333. The light emitting structure 333 can be, but not limited to, a grating structure or a matte surface structure.

The light concentrating component 330 is configured for receiving the optical signals 311 emitting from the first light emitting surface 212c/212d. The light emitting structure 333 is configured for limiting the light emitting angles of the optical signals 311 to increase the light receiving efficiency of the corresponding light sensing component 340. Thus, the light utility efficiency of the optical touch device 200 can be increased, thereby increasing the sensing effect of the light sensing components 340. Additionally, each light emitting and receiving unit 300 can further include a lens set 350. The lens set 350 is disposed between the light sensing component 340 and the light concentrating component 330. The lens set 350 is configured for concentrating the optical signals 311 to the light sensing component 340, thereby further increasing the sensing effect of the light sensing components 340.

It is noted that, when the optical touch device 200 in the present embodiment is applied to a touch display device, the transparent substrate 210 and a substrate of a display panel of the touch display device can be formed integrally. In other words, the transparent substrate 210 can be the substrate of the display panel. In another embodiment, the light path adjusting component 320 can also be omitted. The optical touch device only uses the light concentrating component to increase the light utility efficiency.

Figure 4:
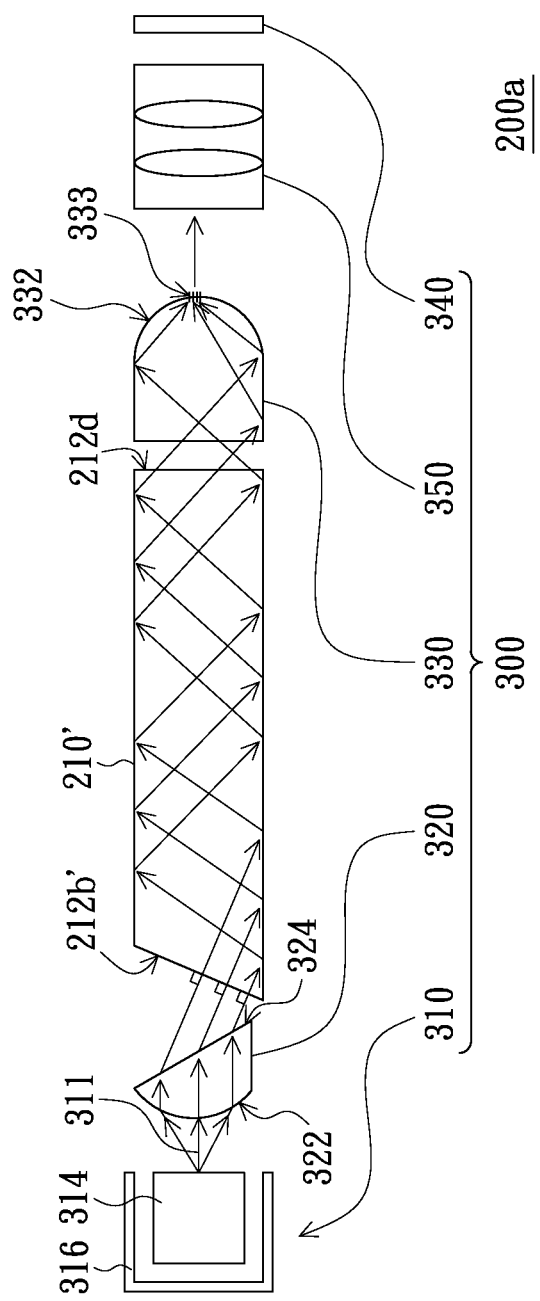
FIG. 4 is a schematic, cross-sectional view of an optical touch device in accordance with another embodiment of the present invention.

FIG. 4 is a schematic, cross-sectional view of an optical touch device in accordance with another embodiment of the present invention. Referring to FIG. 4, in the present embodiment, the optical touch device 200a is similar to the optical touch device 200 except that each first light incidence surface (e.g., the first light incidence surface 212b') of a transparent substrate 210' is an inclined surface. The inclined surface cooperates with the light paths of the optical signals 311 so that the optical signals 311 strike at the first light incidence surface 212b' perpendicularly. As a result, the light incidence efficiency of the optical signals 311 entering into the transparent substrate 210' can be increased, thereby increasing the light utility efficiency of the optical touch device 200a.

Figure 5:
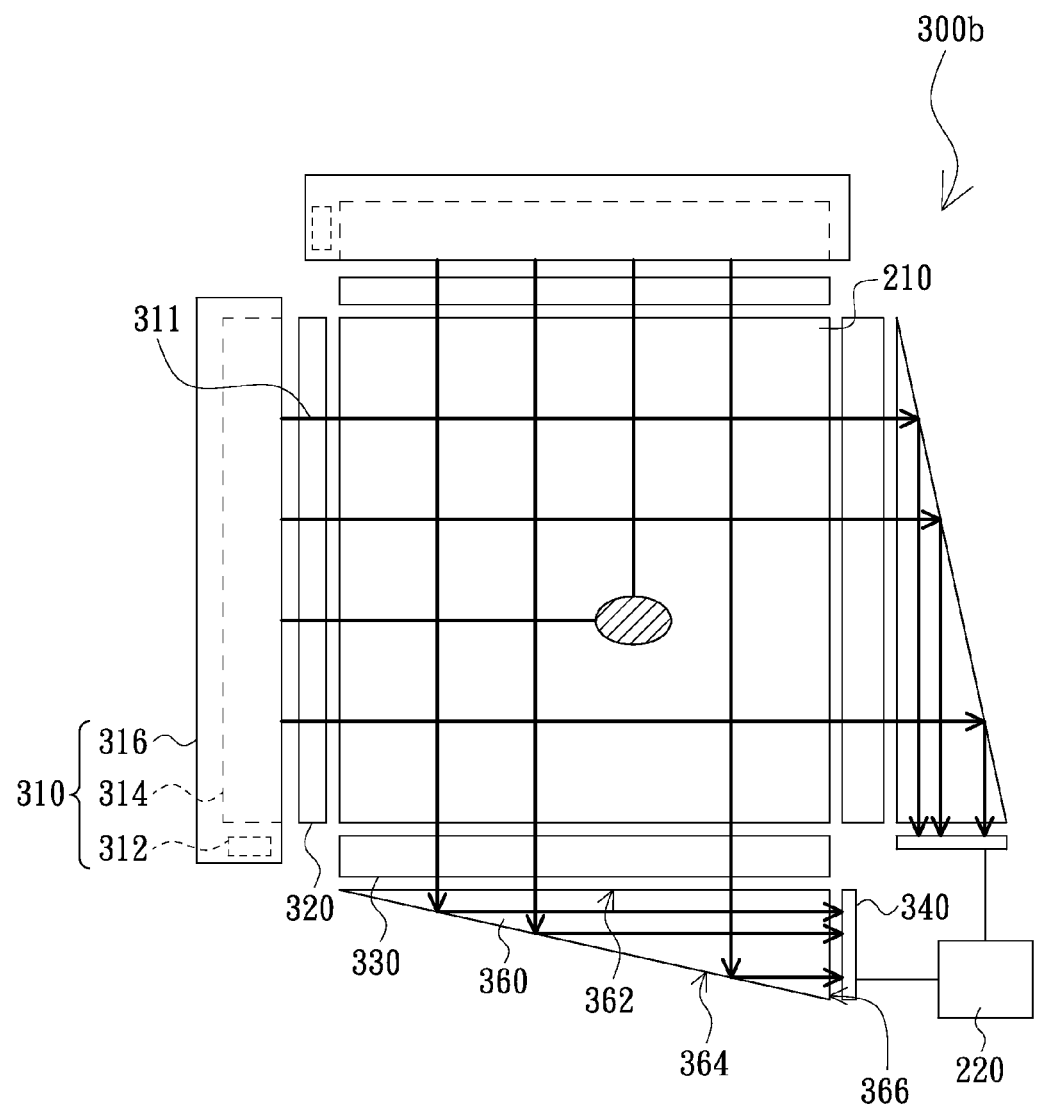
FIG. 5 is a schematic, cross-sectional view of an optical touch device in accordance with further another embodiment of the present invention.

FIG. 5 is a schematic, cross-sectional view of an optical touch device in accordance with further another embodiment of the present invention. Referring to FIG. 5, in the present embodiment, the optical touch device 200b is similar to the optical touch device 200 except that each light emitting and receiving unit 300b of the optical touch device 200b does not include the lens set 350 shown in FIG. 3. In addition, each light emitting and receiving unit 300b of the optical touch device 200b further includes a reflecting member 360. Each reflecting member 360 is disposed between the light sensing component 340 and the corresponding light concentrating component 330 and is configured for reflecting the optical signals 311 to the corresponding light sensing component 340. In detail, each reflecting member 360 is, for example, a prism. The prism includes a third light incidence surface 362, a reflecting surface 364 and a third light emitting surface 366. The third light incidence surface 362 faces to the corresponding light concentrating component 330. The third light emitting surface 366 faces to the corresponding light sensing component 340. The reflecting surface 364 is connected between the third light emitting surface 362 and the third light incidence surface 364. In another embodiment, the lens set 350 as shown in FIG. 3 can also be disposed between the reflecting member 360 and the corresponding light sensing component 340.

Figure 6:
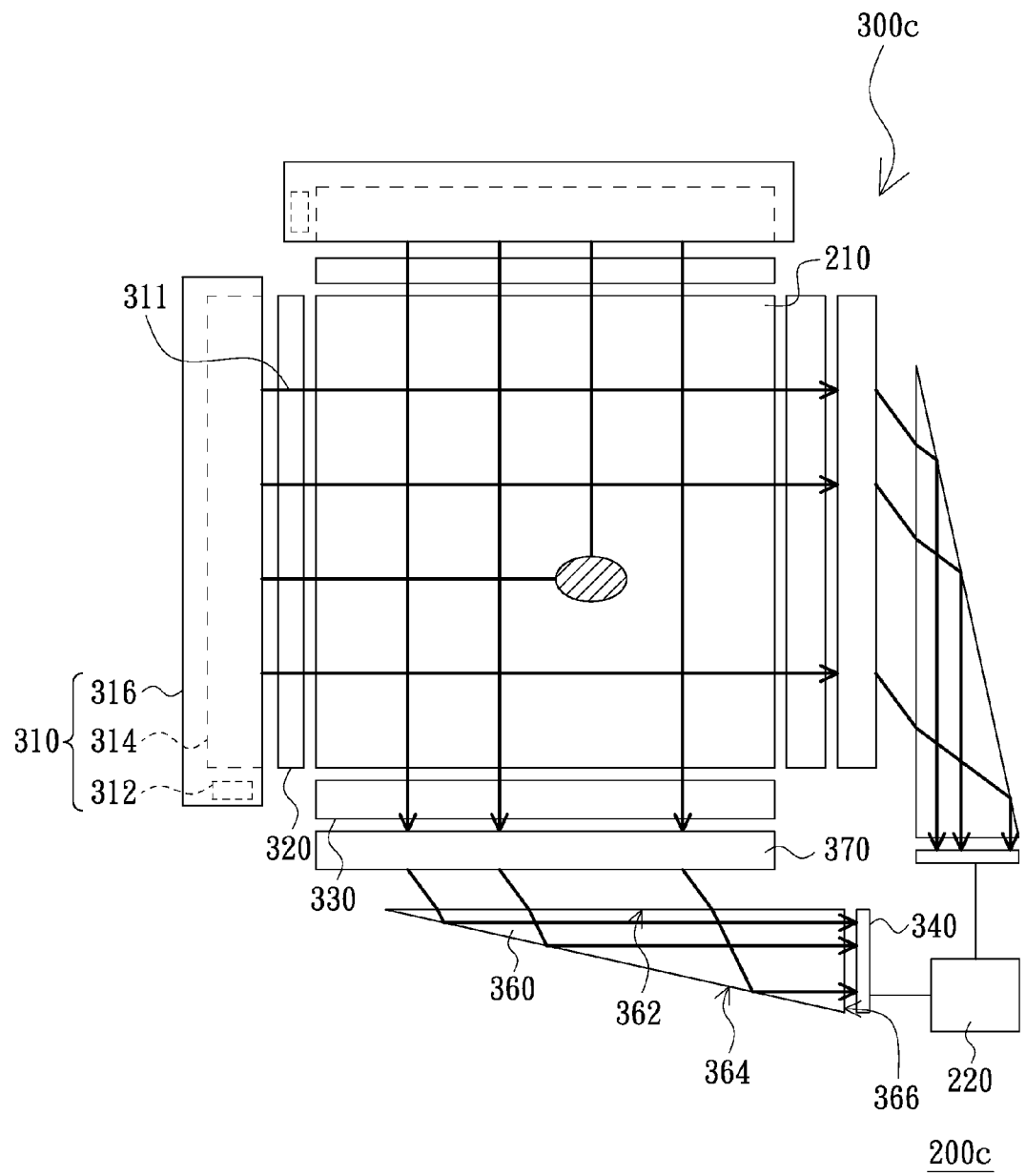
FIG. 6 is a schematic, top view of an optical touch device in accordance with still another embodiment of the present invention.

FIG. 6 is a schematic, top view of an optical touch device in accordance with still another embodiment of the present invention. Referring to FIG. 6, in the present embodiment, the optical touch device 200c is similar to the optical touch device 200b except that each light emitting and receiving unit 300c of the optical touch device 200c further includes a refracting member 370. The refracting member 370 is disposed between the reflecting member 360 and the corresponding light concentrating component 330, and is configured for refracting the optical signals 311 to the reflecting member 360. In addition, in another embodiment, the refracting member 370 can be contacted with the third light incidence surface 362 of the reflecting member 360.

The optical touch devices 200a, 200b, 200c have advantages similar to the optical touch device 200 and are not described here.

In summary, each optical touch device of the present invention has at least one of the following advantages:

1. In one embodiment, the light path adjusting component is applied to adjust the optical signals to have an identical incidence angle striking at the first light incidence surface of the transparent substrate. Thus, the light incidence efficiency of the optical signals entering into the transparent substrate can be increased, thereby increasing the light utility efficiency.

2. In another embodiment, the optical touch device includes a light concentrating component for concentrating the optical signals. The light emitting structure of the light concentrating component can limit the emitting angles of the optical signals emitting from the light emitting surface. Thus, the light incidence efficiency of the optical signals irradiating on the light sensing component can be increased, thereby increasing a light utility efficiency.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch device, comprising:
a transparent substrate comprising a touch surface and a plurality of side surfaces adjacent to the touch surface, at least one of the side surfaces being a first light incidence surface, and at least one of the side surfaces being a first light emitting surface opposite to the first light incidence surface;
at least a light emitting and receiving unit, and each light emitting and receiving unit comprising:
a linear light source disposed beside the first light incidence surface of the transparent substrate and configured for providing a plurality of optical signals into the transparent substrate;
a light path adjusting component disposed between the linear light source and the first light incidence surface and configured for adjusting incidence angles of the optical signals striking at the first incidence surface so that each of the optical signals enters into the transparent substrate through the first incidence surface with a predetermined angle, wherein the light path adjusting component has a bottom surface, a fourth light incidence surface and a fourth light emitting surface opposite to the fourth light incidence surface, the bottom surface is connected between the fourth light emitting surface and the fourth light incidence surface, the fourth light emitting surface is a plane surface and has two opposite edges respectively connected to the bottom surface and the fourth light incident surface, the fourth light incidence surface is a convex curved surface facing to the linear light source, and the fourth light emitting surface is an inclined surface with respective to the bottom surface; and
a light sensing component disposed beside the first light emitting surface, the light sensing component and the linear light source being respectively disposed at two opposite sides of the transparent substrate, and the light sensing component being configured for sensing the optical signals from the linear light source.

2. The optical touch device as claimed in claim 1, wherein the linear light source comprises:
a light guide plate having a second light incidence surface and a second light emitting surface adjacent to the second light incidence surface, and the second light emitting surface facing to the light path adjusting component;
a light emitting component disposed beside the second light incidence surface; and
a shell configured for receiving the light guide plate and the light emitting component.

3. The optical touch device as claimed in claim 2, wherein the light emitting component comprises an infrared light emitting component.

4. The optical touch device as claimed in claim 1, wherein each light emitting and receiving unit further comprises a light concentrating component disposed between the light sensing component and the first light emitting surface and configured for receiving the optical signals emitting from the first light emitting surface, and a light emitting structure is disposed on a surface of the light concentrating component far away from the transparent substrate to transmit the optical signals to the light sensing component through the light emitting structure.

5. The optical touch device as claimed in claim 4, wherein the light emitting structure comprises a grating structure or a matte surface structure.

6. The optical touch device as claimed in claim 4, wherein each light emitting and receiving unit further comprises a lens set disposed between the light sensing component and the light concentrating component and configured for concentrating the optical signals to the light sensing component.

7. The optical touch device as claimed in claim 4, wherein each light emitting and receiving unit further comprises a reflecting member, the reflecting member is disposed between the light sensing component and the light concentrating component and configured for reflecting the optical signals to the light sensing component.

8. The optical touch device as claimed in claim 7, wherein the reflecting member of each light receiving and emitting unit comprises a prism, and the prism has a third light incidence surface facing to the light concentrating component, a third light emitting surface facing to the light sensing component and a reflecting surface connecting between the third light incidence surface and the third light emitting surface.

9. The optical touch device as claimed in claim 7, wherein each light emitting and receiving unit further comprises a refracting member disposed between the reflecting member and the light concentrating component and configured for refracting the optical signals to the reflecting member.

10. The optical touch device as claimed in claim 1, further comprising two reflecting layers respectively formed on the touch surface and a surface opposite to the touch surface, wherein the reflecting layers are configured for reflecting infrared optical signals.

11. The optical touch device as claimed in claim 1, wherein the transparent substrate is a substrate of a display panel.

12. The optical touch device as claimed in claim 1, wherein the first light incidence surface is an inclined surface.

13. The optical touch device as claimed in claim 1, wherein the light sensing component has a sensing region, the optical signals provided by the linear light source are totally reflected in the transparent substrate, when a touch member touches the touch surface, a portion of the optical signals is not totally reflected due to the touch member so that a portion of the sensing region of the light sensing component do not sense the optical signals.

14. The optical touch device as claimed in claim 13, further comprising a processing unit electrically connected to the light sensing component, wherein the processing unit is configured for judging a location of the touch member according to a location of the portion of the sensing region that do not sensing the optical signals.

* * * * *